(12) United States Patent  
Rakers et al.

(10) Patent No.: US 7,148,445 B2
(45) Date of Patent: Dec. 12, 2006

(54) PROCESS FOR MANUFACTURING A TIE ROD HOUSING

(75) Inventors: Helge Rakers, Bád Essen (DE); Achim Möll, Rahden (DE); Martin Wellerding, Damme (DE)

(73) Assignee: ZF Lemförder Metallwarren AG (DE)

( * ) Notice: Subject to any disclaimer, the term of this patent is extended or adjusted under 35 U.S.C. 154(b) by 0 days.

(21) Appl. No.: 10/947,984

(22) Filed: Sep. 23, 2004

(65) Prior Publication Data

US 2005/0035091 A1    Feb. 17, 2005

Related U.S. Application Data

(63) Continuation of application No. PCT/DE03/03535, filed on Oct. 23, 2003.

(30) Foreign Application Priority Data

Oct. 24, 2002  (DE)  ................................ 102 49 768

(51) Int. Cl.
*B23K 11/00* (2006.01)

(52) U.S. Cl. ................................ 219/117.1; 219/137 R
(58) Field of Classification Search ................ 219/107, 219/137 R, 117.1
See application file for complete search history.

(56) References Cited

U.S. PATENT DOCUMENTS 4,087,593 A    5/1978   Phelps et al.
5,662,348 A *  9/1997   Kusama et al. ........ 280/124.134
5,707,073 A *  1/1998   Stuker et al. ............. 280/89.11
5,794,965 A    8/1998   Stuker et al.
6,557,318 B1 * 5/2003   Graber ...................... 52/735.1

FOREIGN PATENT DOCUMENTS

| DE | 195 36 035 C2 |   | 4/1997 |
| DE | 196 42 588 A1 |   | 4/1998 |
| EP | 0 015 693 A1  |   | 9/1980 |
| EP | 0 916 858 A1  |   | 5/1999 |
| JP | 2909666       | * | 4/1999 |

* cited by examiner

*Primary Examiner*—Len Tran
(74) *Attorney, Agent, or Firm*—McGlew & Tuttle, PC

(57) ABSTRACT

A process for manufacturing a tie rod housing formed of a tie rod head (1) and a shaft element (2) fastened thereto. The tie rod head (1) receives its final shape by a mechanical machining process after the manufacture of the tie rod housing blank. The shaft element (2) and the tie rod head (1) are connected by means of a resistance pressure welding process. At least two material accumulations (8, 9), which connect the two components to one another, are brought about by a welding operation. The at least two material accumulations (8, 9) are subsequently created between the outer circumferential surface of the tie rod head (1) and of the shaft element (2).

15 Claims, 3 Drawing Sheets

PROCESS FOR MANUFACTURING A TIE ROD HOUSING

CROSS REFERENCE TO RELATED APPLICATION

This is a continuation of and claims the benefit (35 U.S.C. § 120 and 365(c)) of copending International Application PCT/DE 2003/003535 of Oct. 23, 2003, which designated inter alia the United States and which claims the priority of German Application DE 102 49 768.0 of Oct. 24, 2002. The entire contents of each application is hereby incorporated by reference in its entirety.

FIELD OF THE INVENTION

The present invention pertains to a process for manufacturing a tie rod housing comprising a tie rod head and a shaft element fastened thereto, in which the tie rod head receives its final shape by a mechanical machining process after the manufacture of the tie rod housing blank comprising the shaft element and the tie rod head.

BACKGROUND OF THE INVENTION

Tie rod housings of the type described at the beginning are used as components of motor vehicle steering mechanisms and are subject to the highest safety-relevant general conditions because of their special intended use. These general conditions are dictated by the motor vehicle manufacturers and are divided in the state of the art, e.g., into the safety classes A, B, C and D, where the tie rod housing described at the beginning are subject to the highest safety level D.

In order to guarantee the required process safety of safety level D within the framework of predetermined loads, the possibility of transmission of preset static and dynamic forces as well as of impact stresses is necessary.

To meet the said criteria, tie rod housing blanks comprising a tie rod head and a shaft element are preformed within the framework of a forging process and are brought to their final shape predetermined by the vehicle manufacturer by a subsequent mechanical machining, so that additional components such as seals and bearing components can be mounted in the tie rod head. The entire manufacture comprising the forging process and the subsequent machining process is extremely cost-intensive, and attempts have recently been made to reduce the processing time for the subsequent machining operations by cold forging operations. Cold forging as a manufacturing process is, on the other hand, again relatively complicated and cost-intensive, so that the overall manufacturing price advantages of the alternative mode of manufacture that can be achieved cannot necessarily be considered to be great.

SUMMARY OF THE INVENTION

The object of the present invention is therefore to provide a process for manufacturing a tie rod housing, which can be embodied significantly more favorably in terms of the manufacturing costs compared with the processes known from the state of the art.

This object is accomplished according to the present invention by connecting the shaft element with the tie rod head by means of a resistance welding operation within the framework of the process according to the present invention and by subsequently creating at least two accumulations of material, which connect the two components and are brought about by a welding operation between the outer circumferential surface of the tie rod head and of the shaft element.

The special combination of the said welding operations leads to an overall welded connection between the shaft element and the tie rod head, which meets, analogously to the forged connection that has hitherto been common, all the necessary criteria concerning the transmissibility of static and dynamic forces or in respect to resistance to impact forces. The components involved, namely, the shaft element and the tie rod head, can be manufactured here from suitable bars available at a favorable cost within the framework of preceding machining operations. Moreover, modular versions of tie rod housings, in which it is possible, for example, to combine certain housing heads with shaft elements of different lengths, can be embodied by means of the novel manufacturing process.

The process for manufacturing a tie rod housing provides a tie rod head and a said shaft element fastened thereto. The tie rod head receives its final shape by a mechanical machining process after the manufacture of the tie rod housing blank components comprising the shaft element and the tie rod head. The shaft element is connected with the tie rod head by means of a resistance pressure welding operation. At least two material accumulations are subsequently created between the outer circumferential surface of the tie rod head and of the shaft element. The two material accumulations connect the two components and are brought about by a welding operation.

It proved to be particularly advantageous to arrange the accumulations of material on diametrically opposite sides of the tie rod head and of the shaft element. The opposite arrangement of the material accumulations has an advantageous effect on the dimensions of the tie rod housing, which are of great significance because the space available for installation, in general, in the area of the steering mechanisms of motor vehicles, is small.

The MAG (metal active gas) welding process, which is known from other fields of use and can be carried out at a low cost, has proved to be especially suitable for preparing the material accumulation.

Moreover, it was revealed by experiments that the transmission of the necessary forces between the tie rod head and the shaft element is supported by designing the cross section of the material accumulation as a triangular cross section, wherein the limiting surfaces, which project over the base of the triangle that faces the components to be connected, are sloped at an angle of about 45° in relation to the base.

Moreover, it proved to be advantageous for making it possible to mount adjacent components, for example, sealing elements at the tie rod head, within the framework of the limitation of the overall dimensions, to remove the circular weld seam prepared by the resistance pressure welding operation in partial areas, which are arranged offset by about 90° in relation to the material accumulations, by means of a machining operation and advantageously by a broaching process.

The features of the connection between the tie rod head and the shaft element, which are essential for the present invention and were described at the beginning, make it, moreover, expediently possible to deform the shaft element by a bending operation after the manufacture of the tie rod housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
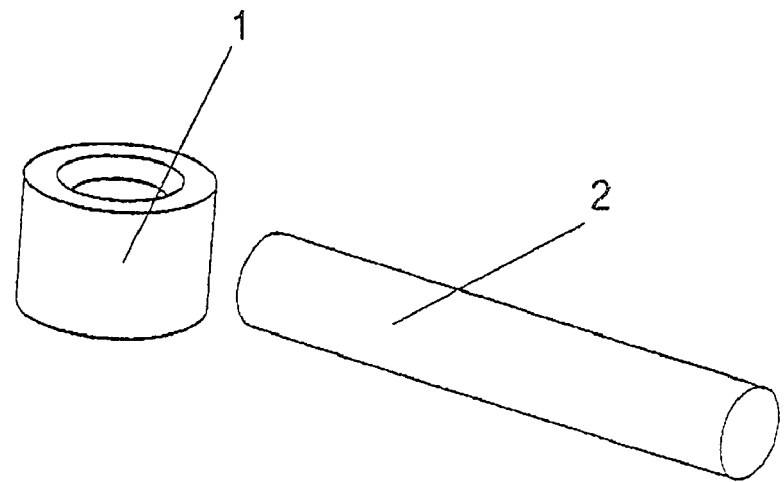
FIG. 1 is a perspective view of a state of the process with blanks provided for the tie rod head and the shaft element.

Referring to the drawings in particular, a tie rod housing is manufactured according to the process according to the present invention. A blank is provided, in principle, a tie rod head 1 and a shaft element 2, which are shown in a perspective view in FIG. 1. The shaft element 2 is a bar-shaped cylindrical solid material and the tie rod housing is a tubular cylindrical element.

Figure 2:
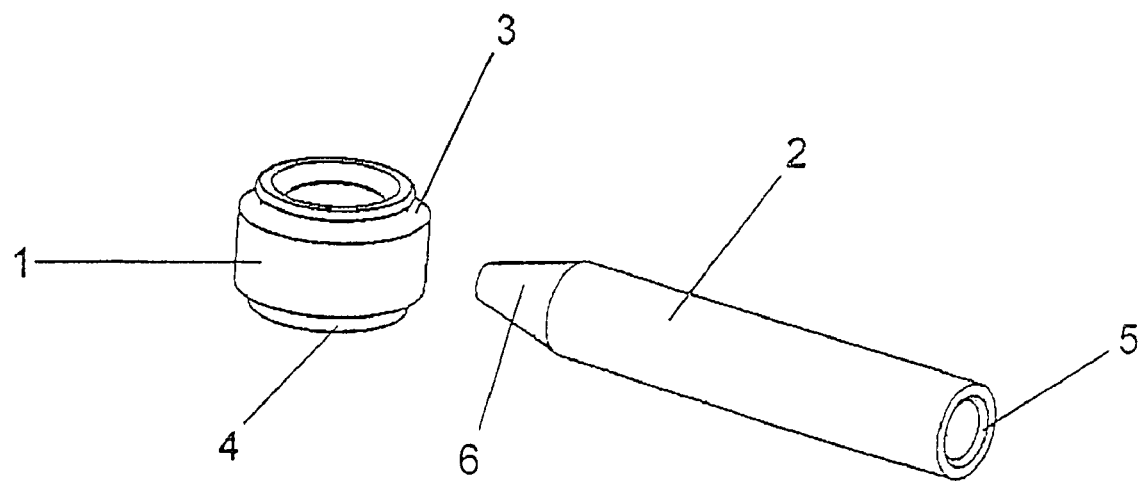
FIG. 2 is a perspective view of a state of the process with the machined tie rod head and the shaft element positioned for connection.
Figure 3:
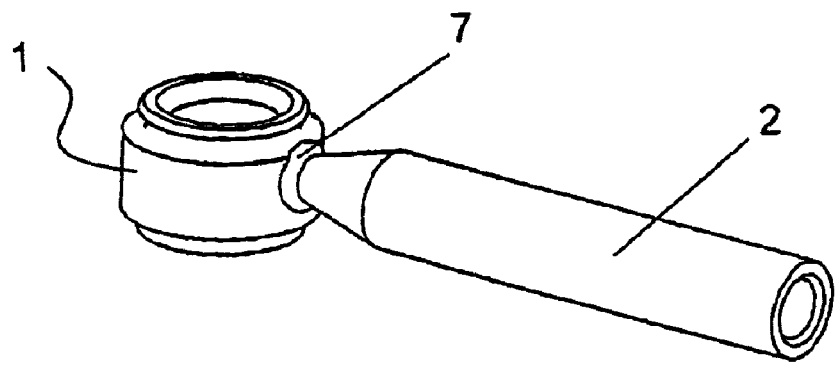
FIG. 3 is a perspective view of a state of the process with showing the results of a resistance pressure welding process used for the tie rod head and the shaft element.
Figure 4:
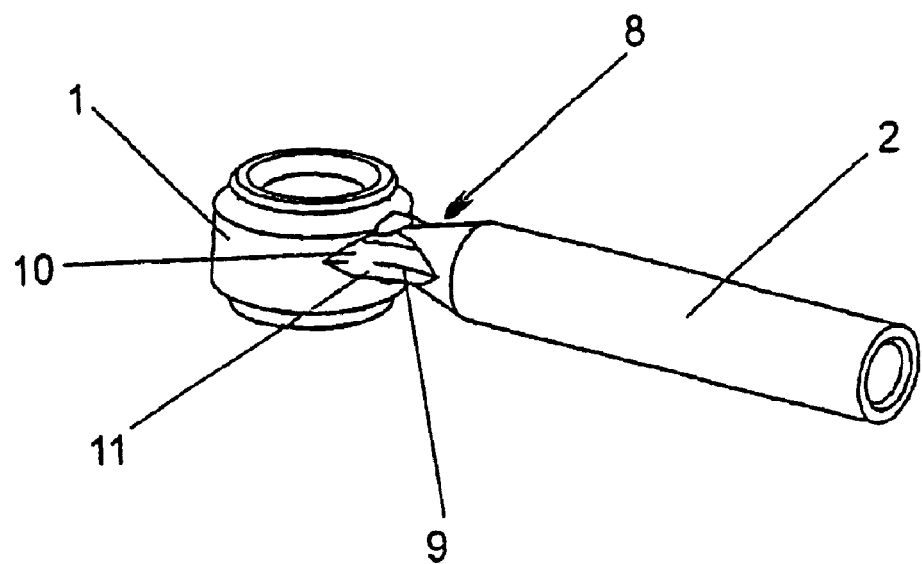
FIG. 4 is a perspective view of a state of the process showing the results of providing material accumulation formed on diametrically opposite sides in the area of the truncated conical end of the connected shaft element.
Figure 5:
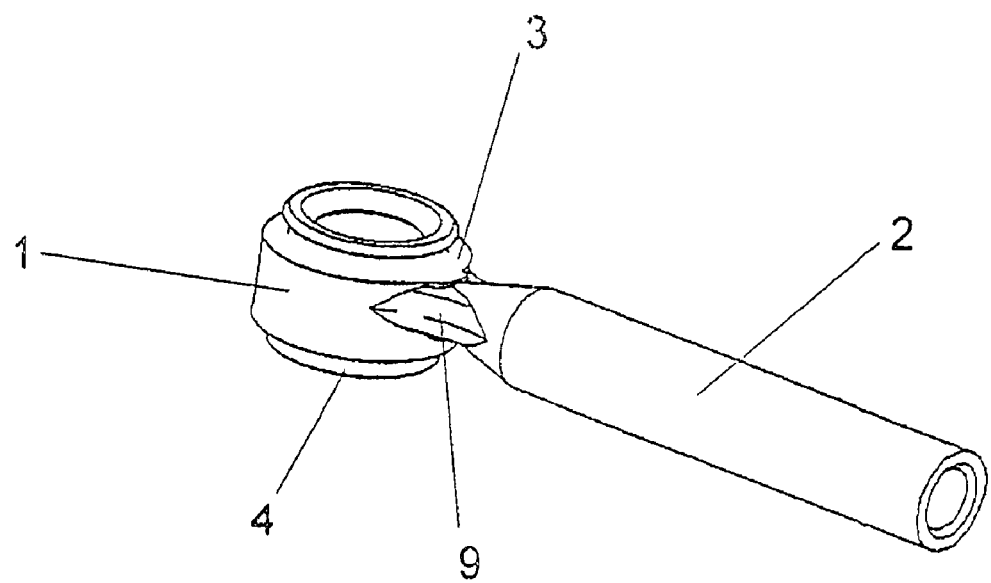
FIG. 5 is a perspective view of a state of the process showing the weld seam, formed within the framework of the resistance pressure welding process, removed.

As is apparent from the view in FIG. 2, the tie rod head 1 as well as the shaft element 2 are provided in a first production step with chamfers 3, 4 as well as 5, whose special designs are adapted to the later installation and attachment conditions of the tie rod housing. At its second free end, which is not provided with the chamfer 5, the shaft element 2 has a truncated conical end 6 at the end of the preparatory measures. With the outer end of the truncated conical end 6, which has a thinner cross section, the shaft element 2 is pressed against the cylindrical outer surface of the tie rod head 1 and is connected with the tie rod head 1 by means of the resistance pressure welding process by applying a corresponding voltage to the components 1 and 2 as well as by applying corresponding pressing forces. A circular weld seam 7 is formed due to this resistance pressure welding operation.

In the next process step for manufacturing the tie rod housing, a material accumulation 8 and 9 each is formed on diametrically opposite sides in the area of the truncated conical end 6 of the shaft element 2 and in the area of the adjoining cylindrical outer surface of the tie rod head 1. These material accumulations 8 and 9 form a reinforcing web each and are welded to the areas, the MAG welding process having proved to be suitable corresponding to an advantageous embodiment. The material accumulations 8 and 9 have essentially a triangular cross-sectional shape, and the outwardly projecting limiting surfaces 10 and 11, which extend obliquely in relation to one another, are sloped at an angle of 45° in relation to the base of the material accumulations.

After the material accumulations 8 and 9, which are used for reinforcement, have been prepared, the weld seam 7 formed within the framework of the resistance pressure welding process is removed in another operation preferably by means of a broaching tool in the area of the respective chamfers 3 and 4.

Figure 6:
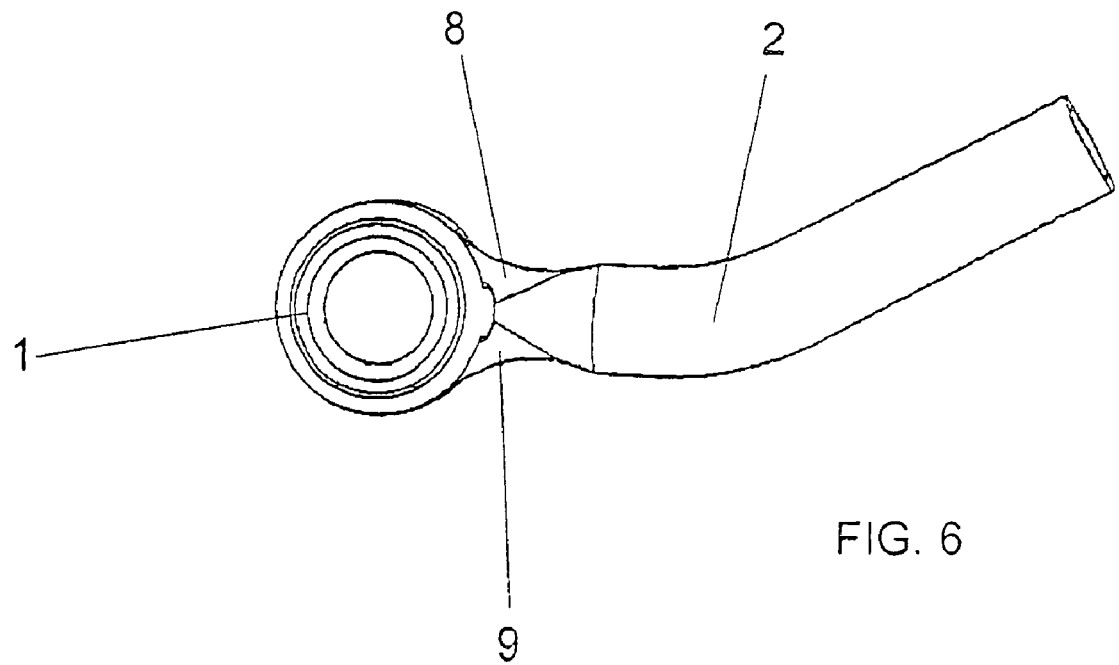
FIG. 6 is a perspective view of a state of the process showing the shaft element bent in another concluding manufacturing step, after the completion of the connection process.

Finally, FIG. 6 shows how the shaft element is bent in another, concluding manufacturing step after the completion of the connection process between the tie rod head 1 and the shaft element 2 in order to adapt it to special installation conditions during the mounting.

While a specific embodiment of the invention has been shown and described in detail to illustrate the application of the principles of the invention, it will be understood that the invention may be embodied otherwise without departing from such principles.

What is claimed is:

1. A process for manufacturing a tie rod housing, the process comprising:
   providing a tie rod head blank and a shaft element blank;
   providing the tie rod head blank with a final tie rod head shape, having an outer circumferential surface, by a mechanical machining process after the manufacture of the tie rod housing blank;
   connecting said shaft element with said tie rod head by means of a resistance pressure welding operation to form a welded connection with a weld seam between said shaft element and said tie rod;
   forming at least two material accumulations as material in addition to said weld seam, at said shaft element and said tie rod by connecting said shaft element with said tie rod head by a subsequent welding operation to create said two material accumulations welded to each of said shaft element and said tie rod for forming an additional connection between said outer circumferential surface of the tie rod head and said shaft element.

2. A process in accordance with claim 1, wherein said material accumulations are arranged on diametrically opposite sides of said tie rod head and of said shaft element.

3. A process in accordance with claim 1, wherein said material accumulations are applied by means of a metal active gas (MAG) welding process.

4. A process in accordance with claim 1, wherein said material accumulations have essentially a triangular shape, wherein the limiting surfaces projecting over the base of the triangle, which faces the components to be connected, are sloped at an angle of about 45° in relation to the base.

5. A process in accordance with claim 1, wherein said step of connecting said shaft element with said tie rod head by means of a resistance pressure welding operation produces a circular weld seam, said process further comprising removing, by means of a machining operation, said circular weld seam in partial areas that are arranged offset by approx. 90° in relation to the material accumulations on the circumference of the shaft part.

6. A process in accordance with claim 5, the machining operation is a broaching operation.

7. A process in accordance with claim 1, wherein said shaft element of said tie rod housing is deformed by a bending operation after it has been finished.

8. A process in accordance with claim 1, wherein said shaft element of said tie rod housing is deformed by a bending operation.

9. A process in accordance with claim 1, wherein said two material accumulations are formed at spaced locations from each other.

10. A process in accordance with claim 9, wherein said weld seam is a circular weld seam formed by resistance pressure welding.

11. A process for manufacturing a tie rod housing, the process comprising:
providing a tie rod head blank and a shaft element blank;
providing the tie rod head blank with a final tie rod head shape, having an outer circumferential surface, by a mechanical machining process after the manufacture of the tie rod housing blank;
connecting said shaft element with said tie rod head by means of a resistance pressure welding operation;
forming at least two material accumulations connecting said shaft element with said tie rod head by a subsequent welding operation to create said two material accumulations between said outer circumferential surface of the tie rod head and said shaft element, wherein said material accumulations have essentially a triangular shape, wherein the limiting surfaces projecting over the base of the triangle, which faces the components to be connected, are sloped at an angle of about 45° in relation to the base.

12. A process for manufacturing a tie rod housing, the process comprising:
providing a tie rod head blank and a shaft element blank;
providing the tie rod head blank with a final tie rod head shape, having an outer circumferential surface, by a mechanical machining process after the manufacture of the tie rod housing blank;
connecting said shaft element with said tie rod head by means of a resistance pressure welding operation to produce a weld seam;
forming at least two material accumulations, as material in addition to said weld seam, connecting said shaft element with said tie rod head by another welding operation subsequent to said resistance pressure welding operation to create said two material accumulations between said outer circumferential surface of the tie rod head and said shaft element.

13. A process in accordance with claim 12, wherein said step of connecting said shaft element with said tie rod head by means of a resistance pressure welding operation produces a circular weld seam and said process further comprises removing, by means of a machining operation, said circular weld seam in partial areas.

14. A process in accordance with claim 13, wherein said partial areas are arranged offset by approx. 90° in relation to the material accumulations on the circumference of the shaft part.

15. A process in accordance with claim 12, wherein said material accumulations are applied by means of a metal active gas (MAG) welding process.

* * * * *